United States Patent [19]

Shimada

[11] 4,004,649

[45] Jan. 25, 1977

[54] MUFFLER

[75] Inventor: Yukio Shimada, Yokohama, Japan

[73] Assignee: Nissan Motor Co., Ltd., Japan

[22] Filed: Mar. 17, 1975

[21] Appl. No.: 559,234

[30] Foreign Application Priority Data

May 23, 1974 Japan .................. 49-59417[U]

[52] U.S. Cl. .................... 181/36 C; 181/36 D; 181/53; 181/57

[51] Int. Cl.² .............................. F01N 3/06

[58] Field of Search ............... 181/36 C, 47 R, 57, 181/53, 36 D, 36 R; 55/276; 23/288 F

[56] References Cited

UNITED STATES PATENTS

| | | | |
|---|---|---|---|
| 2,241,010 | 5/1941 | Chipley | 181/57 |
| 2,732,026 | 1/1956 | Folts | 181/57 |
| 2,839,151 | 6/1958 | Hamilton | 181/57 |
| 3,003,578 | 10/1961 | Ewashuk | 181/53 |
| 3,076,521 | 2/1963 | House et al. | 181/67 X |
| 3,498,406 | 3/1970 | Heath | 181/53 |
| 3,838,977 | 10/1974 | Warren | 23/288 F |

FOREIGN PATENTS OR APPLICATIONS

| | | | |
|---|---|---|---|
| 1,476,625 | 5/1969 | Germany | 181/53 |
| 4,632,371 | 9/1971 | Japan | 181/57 |

*Primary Examiner*—John Gonzales
*Attorney, Agent, or Firm*—Robert E. Burns; Emmanuel J. Lobato; Bruce L. Adams

[57] ABSTRACT

An exhaust system comprises a catalytic converter placed in flow communication with the exhaust gases from an internal combustion engine and a muffler connected with the catalytic converter. The muffler includes a plurality of exhaust gas conduits arranged to form a continuous exhaust gas flow path via a plurality of expansion chambers, in which at least one of the exhaust conduits, except the first of them, has its exhaust gas inlet end closed and is formed with a group of apertures, or holes, which are disposed and sized, such that broken pieces of catalyst carried by the exhaust gases are prevented from entering the one exhaust gas conduit.

7 Claims, 4 Drawing Figures

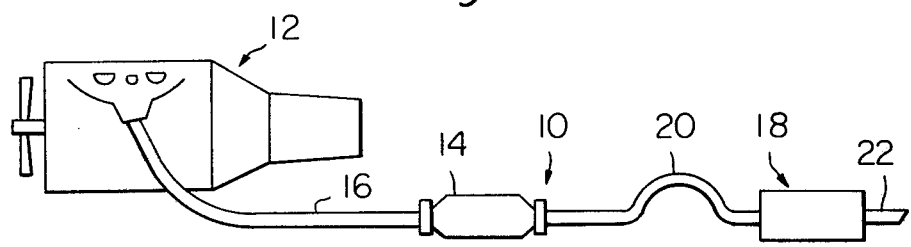
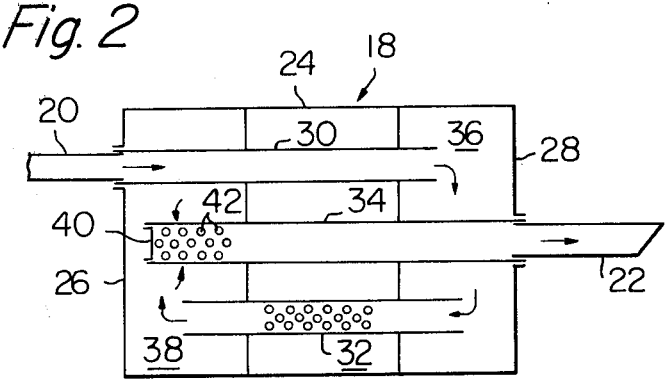
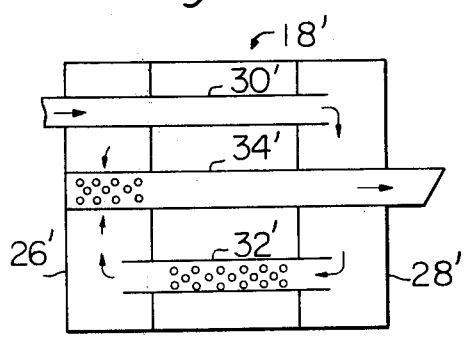 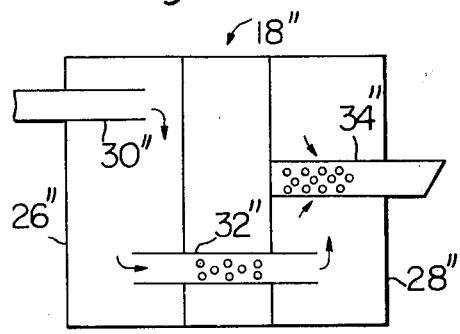

MUFFLER

BACKGROUND OF THE INVENTION

The present invention relates to an exhaust system in which a muffler is connected in series with a catalytic converter, and more particularly to a muffler by which broken pieces of the catalyst in the exhaust gases are filtered out.

It has been proposed as one of the practical ways to solve pollution problem of automotive exhaust gas, is to provide a catalytic converter in an exhaust system of an automotive internal combustion engine. A catalyst in a converter tends to be partly broken or melted into high temperature broken pieces due to excessively high reaction temperature created by the decomposition of a large amount of unburned gas supplied to the catalytic converter upon misfiring of the engine. Thus there is the danger that such high temperature broken pieces of the catalyst are discharged from the exhaust pipe with the exhaust gas, causing fire or hurting walkers on the street.

SUMMARY OF THE INVENTION

One object of the present invention is to solve the problem mentioned as above.

A specific object of the present invention is to provide a muffler by which broken pieces of the catalyst in the exhaust gases are filtered out.

BRIEF DESCRIPTION OF THE DRAWINGS

The present invention will be more apparent from the following description regarding the accompanying drawing, in which:

FIG. 1 is a schematic view an exhaust system of an internal combustion engine having a catalytic converter and a muffler according to the present invention.

FIG. 2 is a diagrammatic longitudinal sectional view of the muffler of FIG. 1;

FIG. 3 is a similar view to FIG. 2, showing a second embodiment of a muffler of the present invention; and FIG. 4 is a similar view to FIG. 2, showing the third embodiment of a muffler of the present invention.

DISCRIPTION OF THE PREFERRED EMBODIMENTS

Referring to FIG. 1 there is schematically shown an exhaust system 10 of an internal combustion engine 12. To oxidize exhaust gas from the engine 12 a catalytic converter 14 is connected to an exhaust pipe 16. A muffler 18 is connected at its inlet side to an outlet pipe 20 of the catalytic converter 14 and at its exhaust or outlet side to an exhaust tail pipe 22.

The muffler 18 not only functions to muffle the sound of exhaust gas from the internal combustion engine 12 but it also serves to trap or filter out broken pieces of the catalyst (not shown) contained in the exhaust gas having past the catalytic converter 14. The muffler 18, as shown in FIG. 2, comprises a tubular body 24 having end closures 26 and 28 on both ends to form a bore (no numercal) closed at both ends, and a plurality of exhaust conduits 30, 32, and 34 extending longitudinally through the body 24. First exhaust conduit 30 is connected at its inlet end to the outlet pipe 20 of the catalytic converter 14, which in turn communicates with the exhaust pipe 16 of the internal combustion engine 12 and functions to oxidize the exhaust gas and to conduct the exhaust gas to exhaust inlet of the first exhaust conduit 30. The exit end of the first exhaust conduit 30 communicates with the inlet end of the second exhaust conduit 32 through an expansion chamber 36. The exit end of the second exhaust conduit 32 communicates with the inlet end of the third or last exhaust conduit 34 through a second expansion chamber 38, forming a continuous exhaust gas flow path through the conduits 30, 32 and 34 and the expansion chambers 36 and 38 and finally engaging at exit end of the last exhaust conduit 34 exhaust tail pipe 22 which serves to conduct the exhaust gas to a remote point at which it is discharged into the atmosphere. To prevent broken pieces of catalyst from being discharged into the atmosphere, at least one exhaust conduit 32 or 34 except the first exhaust conduit 30 has its inlet portion protruded into the associated expansion chamber 36 or 38 from which exhaust gas enters the exhaust conduit 34 and has its inlet end closed by a plug 40 so that the exhaust gas will not enter the exhaust conduit 34 through its inlet end and a group of apertures or holes arranged on that wall portion of the exhaust conduit 34 which is exposed to the expansion chamber 38, the holes being shaped and sized such that broken pieces of catalyst entrained in the exhaust gas are prevented from entering the exhaust conduit 34 together with the exhaust gas. Preferably the shape of the holes is a circular having the diameter ranging from 2 mm to 8 mm and the combining area of the holes is not less than one half of the cross sectional area of the exhaust conduit because the silencing effect is not greatly impaired and the back pressure of the exhaust is not greatly increased. It goes without saying that, if desired, apertures may be formed through the plug 40.

For the ease of collecting broken pieces of catalyst removed from exhaust gas, it is preferable that an exhaust conduit having its inlet end exposed to that expansion chamber which is located adjacent one of end closures of the body be closed and have a group of apertures or holes. Thus in the muffler shown in FIG. 2 it is possible to have the inlet end of the second exhaust conduit 32, instead of the last exhaust conduit 34, closed and formed with a group of apertures or holes.

In the above described construction of the muffler 18 shown in FIG. 2 exhaust gas through the first exhaust conduit 30 flows into a chamber 36 where it diffuses or expands and thence into the second exhaust conduit 32 through its inlet end to be conducted to the second expansion chamber 38. The exhaust gas in the second chamber 38 flows through the group of apertures or holes 42 into the exhaust conduit 34 and then into the tail pipe 22 of the exhaust system 10. If the exhaust gas contains broken pieces of catalyst, as would occur when the catalyst in the catalytic converter is partly broken into pieces by excessively high reaction temperature within the converter 14, the broken pieces of catalyst in the exhaust gas flow are prevented from entering the exhaust conduit 34 and gather at the expansion chamber 38. Therefore the broken pieces of catalyst will not be discharged to the atmosphere. Besides the broken pieces will not gather in any of the conduits 30, 32 and 34 which play important role in muffling the sound of the exhaust gas.

Although in the muffler shown in FIG. 2 an end plug 40 is used, such end plug can be unnecessiated if the inlet end of an exhaust conduit engages one of end closures 26' to be closed thereby, as shown in FIG. 3, and the inlet end of an exhaust conduit 34" engages an adjacent partition wall which is opposed to an end closure 28" and defines a chamber to which the outlet end of an exhaust conduit 32" opens, as shown in FIG. 4.

It will now be appreciated that increase of the back pressure of exhaust due to a muffler of the invention is small and muffling effect is not so impaired because sufficient area for exhaust gas flow is sustained by group of apertures formed on the inlet end portion of an exhaust conduit except the first exhaust conduit.

It will be understood that the invention can be applied to a muffler having one expansion chamber (a pre-muffler).

According to a muffler of the present invention broken pieces of catalyst are prevented from being discharged into the atmosphere through exhaust tail pipe and inherent function as muffler is maintained since the broken pieces are not collected in the exhaust gas conduits, but to one of the chambers.

Excessive increase of exhaust back pressure, which might affect significantly the engine performance, is prevented since the total cross sectional area of the plurality of generally circular apertures is not far smaller than the cross sectional area of the exhaust gas conduit.

In summary according to the present invention, a muffler which can collect the pieces broken from catalyst of a catalytic converter without sacrificing the inherent function as a muffler.

What is claimed is:

1. In an exhaust system for an internal combustion engine, a catalytic converter having an inlet connected in operation with an exhaust pipe of an internal combustion engine and an outlet; and
a muffler comprising a tubular body having a bore and a first and second end closures on both ends, respectively, to close the bore; means dividing the bore of said tubular body into a first expansion chamber in the proximity of the first and closure, means dividing said bore into a second expansion chamber in the proximity of the second end closure and into a third expansion chamber between the first and second expansion chambers; a first exhaust gas conduit having an exhaust gas inlet end connected with the outlet of said catalytic converter, the first exhasut gas conduit extending through the first end closure, the first expansion chamber and the third expansion chamber and having an exhaust gas outlet end projecting into the second expansion chamber; a second exhaust gas conduit having an exhaust gas inlet end opening to the second expansion chamber, the second exhaust gas conduit extending through the third expansion chamber and having an exhaust gas outlet end projecting into the first chamber; and a third exhaust gas conduit having an inlet end projecting into the first expansion chamber, the third exhaust gas conduit extending through the third expansion chamber, the second expansion chamber and the second end closure and having an exhaust gas outlet end opening to the ambient atmosphere, closing means closing the inlet end of the third conduit, the third exhaust gas conduit having a group of apertures in that portion of the third exhaust gas conduit which projects into the first expansion chamber and which is exposed to the third expansion chamber, and the group of apertures being so shaped and arranged such that broken peices issued from said catalytic converter and contained in the exhaust gases within the third expansion chamber are prevented from entering the third exhaust gas conduit.

2. In an exhaust system as claimed in claim 1, in which said closing means comprises a closure plug closing the exhaust gas inlet end of the third exhaust gas conduit.

3. In an exhaust system as claimed in claim 1, in which the first end closure engages with the exhaust gas inlet end of the third exhaust gas conduit to close the exhaust gas inlet end thereof.

4. In an exhaust system as claimed in claim 1, in which the group of apertures are circular apertures, the diameters of which are from 2 milimeters to 8 milimeters and the combined area of all the apertures is not less than one half of the cross sectional area of the third exhaust gas conduit.

5. In an exhaust system for an internal combustion engine, a catalytic converter having an inlet connected in operation with an exhaust pipe of an internal combustion engine and an outlet; and a muffler comprising a tubular body having a bore and a first and a second end closures on both ends, respectively, to close the bore; means dividing the bore of said tubular body into a first expansion chamber in the proximity of the first end closure, means dividing said bore into a second expansion chamber in the proximity of the second end closure and into a third expansion chamber between the first and second expansion chambers; a first gas conduit having an exhaust gas inlet end connected with the outlet of said catalytic converter, the first exhaust gas conduit extending through the first end closure and having an exhaust gas outlet end projecting into the first expansion chamber; a second exhaust gas conduit having an exhaust gas inlet end opening to the first expansion chamber, the second exhaust gas conduit extending through the third expansion chamber and having an exhaust gas outlet end projecting into the second expansion chamber; and a third exhaust gas conduit having an inlet end projecting into the second expansion chamber, the third exhaust gas conduit extending through the second end closure and having an exhaust gas outlet end opening to the ambient atmosphere, closing means closing the inlet end of the third conduit, the third exhaust gas conduit having a group of apertures in that portion of the third exhaust gas conduit which projects into the second expansion chamber and which is exposed to the second expansion chamber, and the group of apertures being shaped and arranged such that broken pieces issued from said catalytic converter and contained in the exhaust gases within the second expansion chamber are prevented from entering the third exhaust gas conduit.

6. In an exhaust system as claimed in claim 5, in which said closing means comprises a partition defining a wall of the second expansion chamber, the partition engaging with the exhaust gas inlet end of the third exhaust gas conduit to close the exhaust gas inlet end thereof.

7. In an exhaust system as claimed in claim 5, in which the group of apertures are circular apertures, the diameters of which are from 2 milimeters to 8 milimeters and the combined area of all the apertures is not less than one half of the cross sectional area of the third exhaust gas conduit.

* * * * *